US011157027B2

(12) United States Patent
Gu et al.

(10) Patent No.: US 11,157,027 B2
(45) Date of Patent: Oct. 26, 2021

(54) HEATER ALARM AND CONTROL MODULE

(71) Applicant: JIANGYIN HUILONG ELECTRIC HEATING APPLIANCE CO., LTD., Jiangsu (CN)

(72) Inventors: Youfan Gu, Jiangsu (CN); Long Xie, Jiangsu (CN)

(73) Assignee: JIANGYIN HUILONG ELECTRIC HEATING APPLIANCE CO., LTD., Jiangsu (CN)

( * ) Notice: Subject to any disclaimer, the term of this patent is extended or adjusted under 35 U.S.C. 154(b) by 180 days.

(21) Appl. No.: 16/065,523

(22) PCT Filed: Dec. 20, 2016

(86) PCT No.: PCT/CN2016/110950
§ 371 (c)(1),
(2) Date: Jun. 22, 2018

(87) PCT Pub. No.: WO2017/107890
PCT Pub. Date: Jun. 29, 2017

(65) Prior Publication Data
US 2019/0138039 A1  May 9, 2019

(30) Foreign Application Priority Data

Dec. 22, 2015 (CN) .......................... 201510971450.X (51) Int. Cl.
*G05D 23/19* (2006.01)
*G05B 19/042* (2006.01)

(52) U.S. Cl.
CPC ....... *G05D 23/1917* (2013.01); *G05B 19/042* (2013.01); *G05D 23/19* (2013.01); *G05D 23/1919* (2013.01); *G05B 2219/25252* (2013.01)

(58) Field of Classification Search
CPC .............. G05D 23/1917; G05D 23/19; G05D 23/1919; G05B 19/042;
(Continued)

(56) References Cited

U.S. PATENT DOCUMENTS 4,199,023 A * 4/1980 Phillips .............. G05D 23/1913
165/243
4,206,552 A * 6/1980 Pomerantz .............. C06F 58/30
34/445
(Continued)

FOREIGN PATENT DOCUMENTS

CN 201402417 Y * 2/2010 ............. F24F 11/30
CN 203759564 U   8/2014
(Continued)

*Primary Examiner* — Nelson J Nieves
(74) *Attorney, Agent, or Firm* — Muncy, Geissler, Olds & Lowe, P.C.

(57) ABSTRACT

A heater alarm and control module includes a main processor of the heater alarm and control module, a heater alarm and control circuit, and a heater temperature controlling module. The heater temperature control module includes n heater temperature controllers. The main processor is connected to the heater temperature control module through the heater alarm and control circuit. The heater temperature controller includes an optically coupled solid-state relay including a light-emitting diode and a power switch; and a photocoupler including a light-emitting diode and a phototriode; and a microprocessor connected to the optically coupled solid-state relay and the photocoupler. The main processor provides a control signal to the heater temperature control module. The heater alarm and control module has a simple structure, and cam change multiple heater temperature set points, thereby easily changing heater temperature settings after installation, enabling activation of a dual operating temperature mode, and saving energy.

20 Claims, 5 Drawing Sheets

(58) Field of Classification Search
CPC ......... G05B 2219/25252; F24H 9/2007; F24H 9/2014; F24H 9/2035; F24H 9/2064; F24D 19/10; F24D 19/1006
See application file for complete search history.

(56) References Cited

U.S. PATENT DOCUMENTS

| | | | | |
|---|---|---|---|---|
| 4,495,560 A | * | 1/1985 | Sugimoto | B60H 1/00814 |
| | | | | 700/34 |
| 4,540,875 A | * | 9/1985 | Buttolph, III | G05D 23/1921 |
| | | | | 219/486 |
| 5,658,480 A | * | 8/1997 | Tennant | H05B 3/74 |
| | | | | 219/485 |
| 7,932,480 B2 | * | 4/2011 | Gu | H05B 1/0244 |
| | | | | 219/482 |
| 9,347,596 B2 | * | 5/2016 | Wortmann | F24S 40/00 |
| 9,686,821 B2 | * | 6/2017 | Kiernan | H05B 3/04 |
| 10,119,727 B2 | * | 11/2018 | Graf | F24H 9/2071 |
| 10,670,302 B2 | * | 6/2020 | Hazzard | F23N 5/242 |
| 2003/0127452 A1 | * | 7/2003 | Gerhardinger | A47F 3/0434 |
| | | | | 219/497 |
| 2005/0160788 A1 | * | 7/2005 | Krajci | G01N 33/0009 |
| | | | | 73/23.2 |
| 2012/0061378 A1 | * | 3/2012 | Colburn | A47J 27/04 |
| | | | | 219/486 |

FOREIGN PATENT DOCUMENTS

| | | | | |
|---|---|---|---|---|
| CN | 104698933 A | * | 6/2015 | ............. F24F 11/30 |
| CN | 104850043 A | * | 8/2015 | ............. F24F 11/30 |
| CN | 204650309 U | | 9/2015 | |
| CN | 105182853 A | * | 12/2015 | ............. F24F 11/30 |
| CN | 105468051 A | | 4/2016 | |
| CN | 105589382 A | | 5/2016 | |
| JP | H04284514 A | | 10/1992 | |

* cited by examiner

HEATER ALARM AND CONTROL MODULE

BACKGROUND OF THE INVENTION

Technical Field

The present invention is involved in the field of industrial temperature control, specifically a kind of heater alarm and control module.

Technical Background

Heating is widely applied in the field of industry. Since heating requires massive energy, suitable and reliable temperature control is necessary to avoid the occurrence of overheating causing damage to equipment and serious potential safety hazards such as fire, etc.

A temperature detector is used as the only feedback signal (including thermocouple and thermal resistance, etc.) for traditional temperature control, which is a passive method of temperature control. If the temperature detector or relay breaks down, temperature control will fail. For example, if the thermocouple is short-circuited at the measuring point when the temperature is under the setting temperature, overheating of the heater will be caused. Even though extra safety equipment, such as thermal fuse, is used, the heater's operation under high temperature may cause serious wear and tear of the heater. Taking heating of a semiconductor downstream line as another example, the high-temperature gas from the reaction chamber may heat the whole heating pipeline, especially when gas flow is extremely high. When a traditional temperature control method is used, temperature feedback purely relies on the temperature detector and such high temperature may cause error alarms, which will affect the technical process.

Generally, a single heater is used for the purpose of reaching a high temperature. Therefore, a single temperature control method is enough. However, in the semiconductor industry, heating for longer pump lines is frequently required, and uniform and reliable temperature control must be guaranteed. In addition, the heater must be easily installed and dismantled since the heating pipelines typically require preventive maintenance. Therefore, multiple temperature controllers must be adopted to satisfy these requirements. A low-cost and reliable temperature controller is necessary. In addition, heating pipelines are usually very long, making energy consumption a serious problem. Besides, the requirements of heating temperature depend on the technical process. Thus, a flexible and convenient method for changing of the setting temperature and the power control is critical for heating of semiconductor process lines.

Moreover, under the working conditions of long pipeline heating (such as heating of a semiconductor process line), since multiple temperature controllers (which can sometimes reach dozens of controllers) are used simultaneously, temperature alarms and monitoring are generally utilized for the whole process pipeline, rather than for a single temperature controller. A heater alarm and control module should be designed according to these requirements in order to make it easy to learn the working status of the whole heating pipeline and to easily control multiple heaters.

Current alarm devices have a relatively single function. The alarm relays in the series temperature controller can only provide low-temperature alarms and display the normal working status. In addition, multi-point communication protocols (such as RS485, Ethernet and EtherCAT) can be used for control of a single temperature controller. However, every controller must comprise communication hardware, which leads to cost increases and volume enlargement of the temperature controller. In addition to this, every temperature controller must also be equipped with a corresponding address, which makes installation of the heater and temperature settings very complicated.

Moreover, energy conservation has become an important goal. The heaters are usually installed in the control environment with an air conditioner and the heat released to the environment will cause the temperature to rise. Therefore, more operating power is required to ensure temperature control of the air conditioner.

SUMMARY OF THE INVENTION

In order to solve the foregoing problem, the present invention provides a kind of heater alarm and control module, including a main processor of a heater alarm and control module, a heater alarm and control circuit, and a heater temperature control module. The heater temperature control module contains n heater temperature controllers. The main processor of the heater alarm and control module is connected with the heater temperature control module through the heater alarm and control circuit. The heater temperature controller includes a microprocessor, an optically coupled solid-state relay and an optocoupler. The optically coupled solid-state relay contains a light-emitting diode and a power switch, and the optocoupler contains a light-emitting diode and phototriode. The microprocessor is connected with the optically coupled solid-state relay and the optocoupler, in which one end of the power switch of optically coupled solid-state relay is connected with the positive electrode of the light-emitting diode of the optocoupler. This coupling end constitutes the input end of the heater temperature controller, and the other end of the power switch of the optically coupled solid-state relay becomes the first output end of the heater temperature controller. The negative electrode of the light-emitting diode of the optocoupler becomes the second output end of the heater temperature controller. The positive electrode of the light-emitting diode of the optically coupled solid-state relay is connected to the direct-current power supply while the negative electrode of the light-emitting diode is connected with one I/O interface of the microprocessor (uP1). The collector electrode of the phototriode of the optocoupler is connected to the direct-current power supply. The emitting electrode is grounded and simultaneously connected to the CCP and analog signal input end of microprocessor. The main processor of the heater alarm and control module provides the control signal for the heater temperature control module, and this control signal is input into the input end of the first heater temperature controller. The input end of the second heater temperature controller is connected with the first output end of the first heater temperature controller, and likewise, the input end of the latter heater temperature controller is connected with the first output end of the preceding heater temperature controller sequentially until the input end of the nth heater temperature controller is connected with the first output end of the (n-1)th heater temperature controller. The second output ends of n heater temperature controllers are linked and connected to the main processor of the heater alarm and control module through the heater alarm and control circuit.

The first output end of the nth heater temperature controller is connected with one end of terminal loop capacitor while the other end of the terminal loop capacitor is connected with the second output end of the nth heater temperature controller. The one end of terminal loop capacitor connected with the second output ends of n heater temperature controllers is connected to the main processor of the heater alarm and control module through the heater alarm and control circuit.

Wherein, the main processor of the heater alarm and control module provides three kinds of control signals for heater temperature control module i.e. a direct-current power supply, a weak-power PWM signal, and a high-power PWM signal. These signals are used to realize three kinds of working modes, i.e. a control mode, an alarm mode, or a temperature setting mode, respectively.

Moreover, high-power PWM signal is output to the input end of the first heater temperature controller after power improvement through a buffer operational amplifier.

In addition, direct voltage is measured by connecting the second output ends of n heater temperature controllers with the analog signal input end of the main processor of heater alarm and control module; meanwhile, frequency is measured by connecting the first capacitor with the CCP terminal of the main processor of the heater alarm and control module. One end of the terminal loop capacitor connected with the second output ends of n heater temperature controllers is grounded through the AC dividing capacitor; meanwhile, it is connected with the collector electrode of a triode. The base electrode of the mentioned triode is connected with one I/O terminal of the main processor of the heater alarm and control module. The emitting electrode of the triode is grounded, and during alarm, the mentioned triode is under the status of cut-off; instead, it is conductive during control over temperature controller.

Specifically, when the input signal is a weak-power PWM signal, this signal is input to the heater temperature control module through the input end of the first heater temperature controller. The optocoupler in n temperature controllers of the heater temperature control module is under the status of an open circuit. The optically coupled solid-state relays in n temperature controllers form a series circuit. When the temperature of the heater is lower than the set value of temperature controller, the microprocessor of the heater temperature controller will be connected to the I/O interface of the negative electrode of the light-emitting diode of the optically coupled solid-state relay in order to output high potential to make the optically coupled solid-state relay under status the of an open circuit. When temperature of the heater falls within the control scope of the temperature controller, the microprocessor of the heater temperature controller will be connected with the I/O interface of negative electrode of the light-emitting diode of the optically coupled solid-state relay to output low potential to make the optically coupled solid-state relay to be under the status of a closed state. The n optically coupled solid-state relays connected in series and the terminal loop capacitor constitute the loop of alarm control circuit.

Specifically, when the heater alarm and control module is about to make a control operation towards the heater temperature controller, a PWM signal of specific frequency is initially sent to input the signal into the input end of the first heater temperature controller. The microprocessor in the first heater temperature controller will detect the frequency of this signal through the optocoupler. If it is confirmed that the heater alarm and control module will send the specific frequency signal of the control signal, the microprocessor in the heater temperature controller will give commands to compulsively close the optically coupled solid-state relay, and let the PWM signal of the specific frequency be output from the first output end of the first temperature controller and to be transmitted to the input end of the second heater temperature controller. In a similar way, the microprocessor in the latter heater temperature controller will give commands to compulsively close the optically coupled solid-state relays one by one, until all the optically coupled solid-state relays of n heater temperature controllers are closed. The heater alarm and control module will close the fore-mentioned triode and start to send the DC voltage signal or output the high-power PWM signal after power promotion through the buffer operational amplifier to control each heater temperature controller.

Preferably, when optically coupled solid-state relays in all the heater temperature controllers are compulsively closed, the heater alarm and control module will output one DC voltage signal to judge if the terminal loop is short-circuited. If the terminal loop is under state of a DC short circuit, the analog input end of main processor of heater alarm and control module will detect this DC voltage signal and will stop the control operation for the heater temperature controller. If the terminal loop is under an open circuit condition, or has loop capacitance, the analog input end of the main processor of the heater alarm and control module will not detect this 5V voltage and will continue the control operation for the heater temperature controller.

Specifically, the temperature setting of the heater temperature controller is realized through the high-power PWM signal sent by the main processor of the heater alarm and control module. The high-power PWM signal is able to drive all the optocouplers in the heater temperature controller after power promotion through the buffer operational amplifier. The mentioned triode is conductive. When the microprocessor in the heater temperature controller receives the pulse signal of the mentioned amplified high-power PWM signal, the microprocessor in the heater temperature controller will detect the high-power PWM signal frequency and convert it into the temperature set value.

Further, sleep control/activation of the second temperature control by the heater can be realized through the DC voltage signal provided by the heater alarm and control module. The second temperature set value is saved in the microprocessor in each heater temperature controller, when the heater alarm and control module closes the mentioned triode to control each heater temperature controller, the DC voltage signal will be sent and detected by microprocessor of each heater temperature controller. If the mentioned DC voltage signal is not detected, the temperature controller will use the normal temperature set value in the microprocessor, if the mentioned DC voltage signal is detected, the temperature controller will use the second temperature set value in the microprocessor for temperature control.

The heater alarm and control module has a simple structure and is easy for installation and design. The module can be assembled according to a length of heating pipe with uniform control. The module is also able to modify multiple heater temperature setting points along the whole heating line, which is convenient for users to modify the settings for temperature of a heater after installation. In addition, the heater alarm and control module is able to activate dual operation temperature modes; the heater can maintain at normal temperature working mode, and the module can also be maintained at a low temperature working mode, or can be closed to save energy according to the process requirements.

The most important is that heater temperature set value will not change frequently. The variation range of temperature control is very small, it is not necessary to obtain accurate temperature reading if the operation of the heater is normal (within the control scope).

The heater alarm and control module possesses the following functions:

Low temperature/high temperature alarm

Convenient for modifications of temperature settings for a temperature controller Conveniently open and close the heater Reduce communication/control connections as much as possible.

DESCRIPTION OF THE PREFERRED EMBODIMENTS

Figure 1:
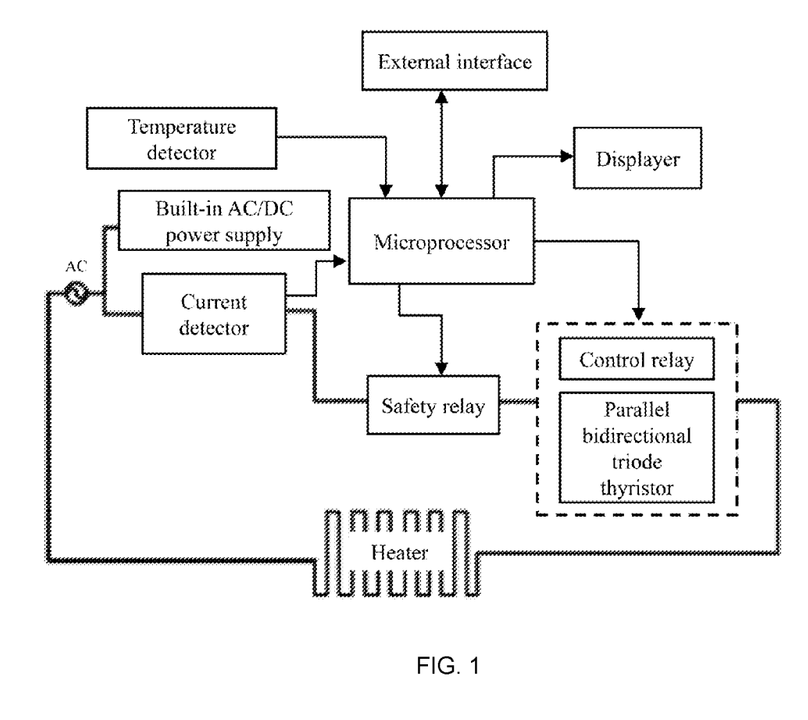
FIG. 1 is the block diagram of the temperature controller of the present invention.

As shown in FIG. 1, the temperature controller of the present invention includes a microprocessor, a temperature detector, a current detector, a safety relay, a control relay and an external interface. The temperature detector is used to detect the working temperature of the heater; the current detector is used to detect the current value passing through the heating element. The microprocessor will determine the working condition of the temperature controller according to the temperature and current values received from the temperature detector and current detector, and will send the control signal to the safety relay and control relay to control the working condition of the heater to regulate the temperature. The safety relay is used to cut off power supply to the heater when the microprocessor determines that the working conditions of the temperature controller are abnormal.

The external interface is connected to the optically coupled solid-state relay and the optocoupler. The optically coupled solid-state relay is used to provide the alarm signal. For example, when the heater reaches a set temperature value, the optically coupled solid-state relay will operate under a conductive state and send alarm information. When the heater temperature is lower than the set value, the optically coupled solid-state relay will operate under the state of open circuit. The optically coupled solid-state relay is controlled by the microprocessor. The optocoupler is used for remote control of the temperature controller, including switching of the control and working modes of the heater, modification of temperature set value. The working mode of optocoupler is controlled by the strength of the external signal. When the external signal is very weak and its power is insufficient to drive the optocoupler (such as the PWM signal sent by a microprocessor), the optocoupler will not operate. When the external signal is strong, the optocoupler will be driven and the LED in it will be lit to deliver the signal to microprocessor. This is used for temperature setting of the temperature controller, or determination of the working mode for the temperature controller.

Generally, a certain heating temperature is required for pipeline heating. However, for the sake of energy conservation or process, the heater temperature can be properly lowered under certain conditions, or even can be closed. The temperature controller of this invention can preset two different temperatures and carry out rapid switching of working modes (temperatures) for the heater.

To sum up, the temperature control of the present invention can work independently without an external control signal (temperature control). In addition, it can carry out a low temperature/high temperature alarm according to an external connection and enter two different working modes, or carry out the setting operation of the temperature set value for the temperature controller.

In the temperature control of the present invention, the temperature detector is used to detect the working temperature of the heater. The current detector is used to detect the current value of the heating element to determine the operational condition of the heater. Under normal working conditions, when the heater is powered on, the current will be over zero, when heater is closed and cooled, the current will be zero. Through combination of measurement of current and temperature, working conditions of the heater can be accurately determined.

When the current value is over zero but the space temperature of heater is not increasing, it can be determined that the thermocouple has failed. When the current value is over zero but the measured temperature is decreasing, it can be determined that the thermocouple is connected inversely. In these conditions, the heater has to be closed immediately and alarm information will be sent; otherwise, the temperature will keep rising until the thermal fuse has melted. In addition, if the temperature is increasing but the current is zero, it means that gas is heated reversely towards the heating jacket along the pipeline. In this condition, although an alarm of excessive temperature can be sent, it is unnecessary to stop the whole process so that unnecessary downtime loss can be avoided.

An electric arc will be generated when a high-voltage mechanical relay is operated. The heat generated by such a high-voltage arc can melt and oxidize any contactors, which will greatly affect the working life of the mechanical relay. Under conditions of maximum rated operating current, service time of an ordinary mechanical relay is only 0.1 million times, which is far from adequate for temperature control. However, if a solid-state bidirectional triode thyristor relay is used, massive heat will be generated under the working conditions of heavy current due to high internal resistance, which requires a large radiator and will reduce the reliability of the elements. Therefore, as shown in FIG. 1, the control relay of temperature controller of this invention is connected with a solid-state bidirectional triode thyristor in series to eliminate the electric arc generated during operation of the mechanical relay to improve the service time of the mechanical relay. The solid-state bidirectional triode thyristor shall be conducted before operation of mechanical relay, which will greatly reduce the voltage of the contactor of the mechanical relay (<1V) to avoid the electric arc generated during operation of high-voltage mechanical relay. The application of this no-arc relay will promote its working life by hundred times.

In order to reduce electrical noise and further improve reliability of the bidirectional triode thyristor, the microprocessor with the function of no-voltage detection is adopted in this invention so that alternating current of on-off of switch of bidirectional triode thyristor is at a near zero voltage.

Figure 2:
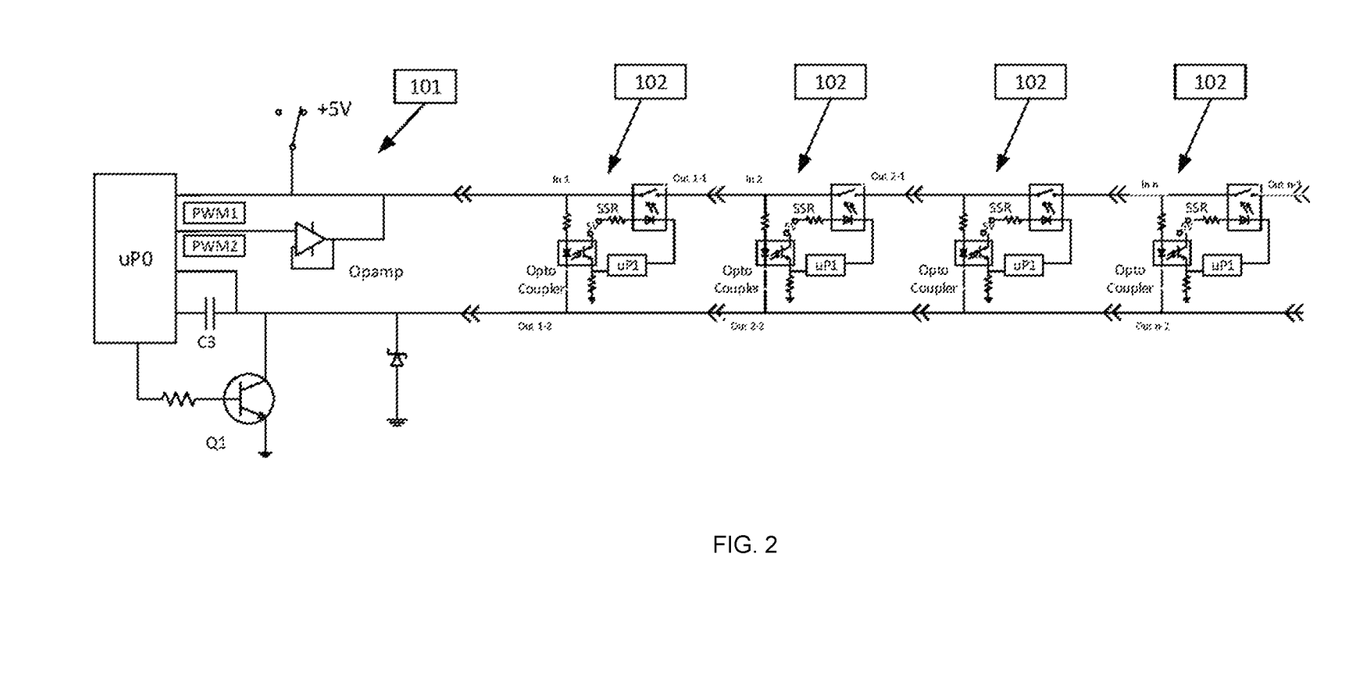
FIG. 2 is the circuit diagram of the heater alarm and control module with multiple temperature controllers as shown in FIG. 1.

As shown in FIG. 2, heater alarm and control module is further illustrated, including a main processor uP0 of the heater alarm and control module, the heater alarm and control circuit and the heater temperature control module. The heater temperature control module contains n heater temperature controllers 102 as shown in FIG. 1; the main processor uP0 of the heater alarm and control module is connected with the heater temperature control module through the heater alarm and control circuit.

Each heater temperature controller 102 in FIG. 2 only displays the components related to the alarm and is composed of the temperature controller shown in FIG. 1 with the same circuit structure which mainly includes one optically coupled solid-state relay, one optocoupler and microprocessor uP1 (the microprocessor of temperature controller in FIG. 1). However, the components for the heater control are ignored. Refer to FIG. 1.

The optically coupled solid-state relay SSR includes a light-emitting diode and a power switch; it controls switching of the power switch according to the existence of the signal input in the light-emitting diode. The optocoupler includes a light-emitting diode and a phototriode, and it controls the break-over and cut-off of the phototriode according to the existence of a signal input in the light-emitting diode.

One end of the power switch of the optically coupled solid-state relay SSR is connected with the positive electrode of the light-emitting diode of the optocoupler. The connection end constitutes the input end (Inn in FIG. 2) of the heater temperature controller 102, and the other end of the power switch of the optically coupled solid-state relay SSR becomes the first output end (Out n-1 in FIG. 2) of the heater temperature controller 102. The negative electrode of the light-emitting diode of the optocoupler becomes the second output end (Out n-2 in FIG. 2) of the heater temperature controller 102. The positive electrode of the light-emitting diode of the optically coupled solid-state relay SSR is connected to 5V DC power supply while its negative electrode is connected to one of the I/O interfaces of microprocessor uP1. The optically coupled solid-state relay SSR is controlled by microprocessor uP1 through the I/O interface.

The collector electrode of the phototriode of the optocoupler is connected to 5V DC power supply; the emitting electrode is grounded and connected to CCP (capture, compare, and PWM) of microprocessor uP1 and the analog signal input end simultaneously. The optocoupler is controlled through output of the heater alarm and control module. The positive electrode of the built-in light-emitting diode of the optocoupler (the input end of heater temperature controller 102) is connected with the output end of the heater alarm and control module. If the input signal is a DC voltage, microprocessor uP1 is able to measure its voltage value; when the input signal is a pulse PWM signal, microprocessor uP1 can measure its frequency.

Figure 3:
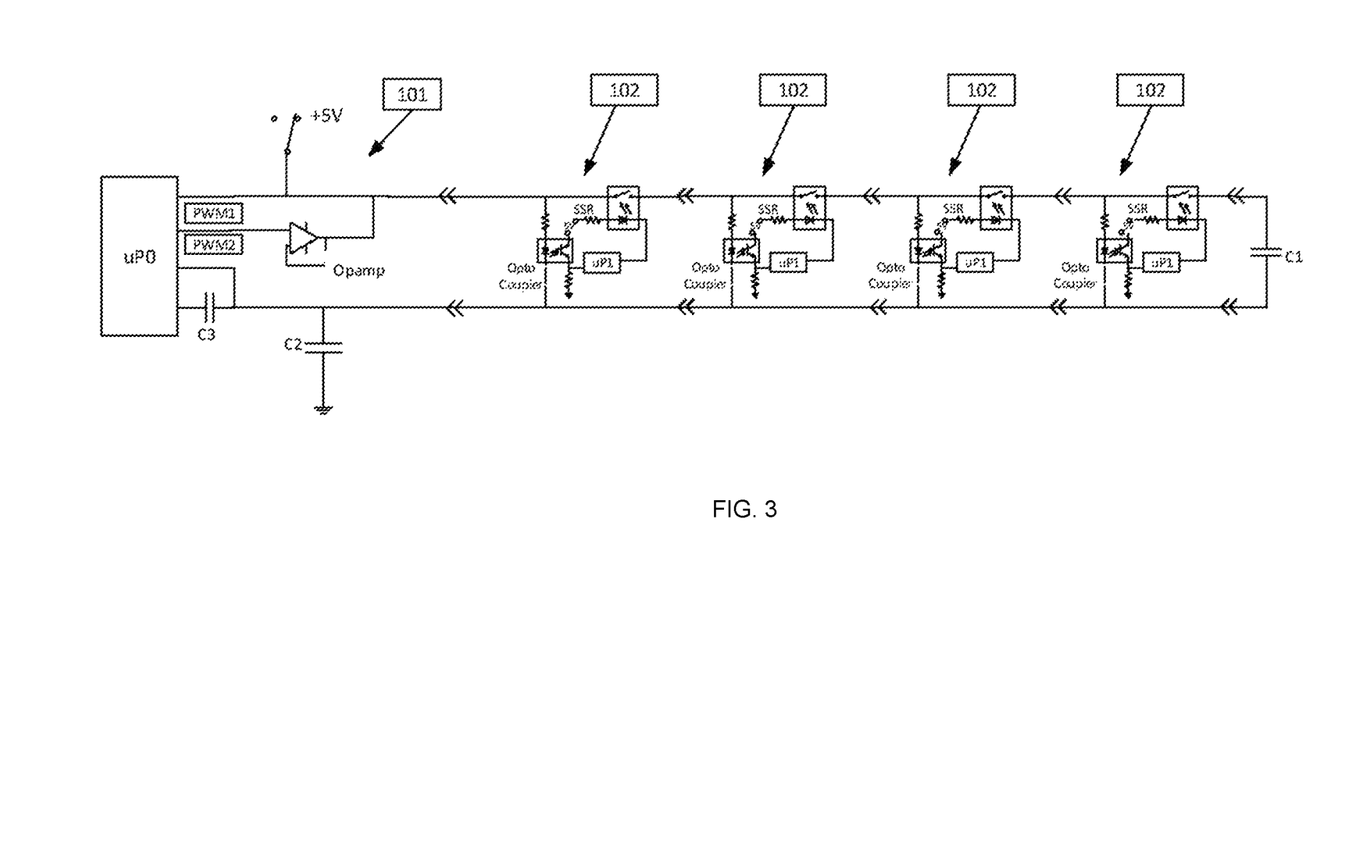
FIG. 3 is the equivalent circuit of the heater alarm and control module under normal alarm working conditions.

The main processor uP0 of the heater alarm and control module is able to provide three different control signals for the heater temperature control module through the heater alarm and control circuit, i.e. (5V) DC, weak-power PWM1 signal and high-power PWM2 signal to be input into the input end of the first heater temperature controller 102. In which, the high-power PWM2 signal will be output to the input end of the first heater temperature controller 102 after power promotion through the buffer operational amplifier. The input end of the second heater temperature controller 102 is connected with the first output end of the first heater temperature controller 102; likewise, the input end of the latter heater temperature controller 102 is connected with the output end of the preceding heater temperature controller 102 sequentially, until the input end of the nth heater temperature controller 102 is connected with the output end of the (n-1)th heater temperature controller 102; the output end of the nth heater temperature controller 102 is connected to one end of terminal loop capacitor C1 (FIG. 3). The other end of the terminal loop capacitor C1 is connected with the second output end of n heater temperature controllers 102, and the end of terminal loop capacitor C1 connected with the second output end of n heater temperature controllers 102 is connected to the main processor uP0 of the heater alarm and control module.

Specifically, the second output end of n heater temperature controllers 102 is connected to the analog signal input end (AI) of the main processor uP0 of the heater alarm and control module to measure DC voltage. It is also connected to the CCP end of the main processor uP0 of the heater alarm and control module through the first capacitor C3 to measure frequency. The end of terminal loop capacitor C1 connected with the second output end of n heater temperature controllers 102 is grounded through AC dividing capacitor C2; meanwhile, it is connected with collector electrode of one triode Q1. The base electrode of the mentioned triode Q1 is connected with one I/O terminal of the main processor uP0 of the heater alarm and control module. The emitting electrode of triode Q1 is grounded. During an alarm, the triode Q1 is under the cut-off state; while it is conductive when it controls the temperature controller.

As described above, the main processor uP0 of the heater alarm and control module provides three different control signals for the heater temperature controller 102, i.e. (5V) DC, a weak-power PWM1 signal, and a high-power PWM2 signal. These signals are used for three working modes for temperature controller, i.e. a control mode (5 VDC), an alarm mode (weak-power PWM1), or a temperature setting mode (high-power PWM2).

When the weak-power PWM1 signal (alarm mode) is input, this signal will be initially input into the input end of the first heater temperature controller 102. Since the PWM1 signal is very weak, the optocoupler in the temperature controller is under the state of an open circuit. Therefore, it is equivalent to the series circuit composed of the optically coupled solid-state relay SSR in n temperature controllers 102.

At this moment, the condition of the optically coupled solid-state relay SSR is controlled by microprocessor uP1. The action of SSR is completed by the built-in light-emitting diode. When the heater temperature is lower than the set value of the temperature controller, the I/O interface of microprocessor uP1 connecting the negative electrode of light-emitting diode of the optically coupled solid-state relay SSR will output high potential to make SSR under the state of an open circuit. When the heater temperature is within the control range of the temperature controller (near the set value; the specific range is preset), the I/O interface of microprocessor uP1 connecting the negative electrode of the light-emitting diode of the optically coupled solid-state relay SSR will output low potential to make SSR under the closed state. The optically coupled solid-state relay SSR in heater temperature controller 102 connected in series and terminal loop capacitor C1 constitute the loop of the alarm control circuit.

If the heater controlled by the first heater temperature controller 102 has entered the control range of the temperature controller, the internal optically coupled solid-state relay SSR will be under the closed state. At this moment, the alarm weak-power PWM1 input signal will be output from the first output end of the first heater temperature controller 102 and will enter the second heater temperature controller 102 through its input end successively, until the nth heater temperature controller 102. However, when the heater controlled by a certain heater temperature controller 102 is not within control range of temperature controller, the optically coupled solid-state relay SSR in this heater temperature controller 102 will be under the state of an open circuit. At this moment, the alarm of the weak-power PWM1 input signal will not be output from the first output end of the heater temperature controller 102. The weak-power PWM1 signal will not return to the main processor uP0 of the heater alarm and control module.

In such a case, only when all the n heater temperature controllers 102 along the pipeline enter the control range of the temperature controller, can the alarm of the weak-power PWM1 input signal be transferred to the nth heater temperature controller 102 from the first heater temperature controller 102, and can a closed AC loop be formed through terminal loop capacitor C1. The alarm weak-power PWM1 input signal sent by heater alarm and control module will be transferred back to the heater alarm and control module. Conversely, as long as one of the temperature controllers in n heater temperature controllers 102 along the pipeline is not within the control range of temperature controller, the alarm of the weak-power PWM1 input signal will not be transferred back to the main processor uP0 of the heater alarm and control module. Therefore, when the main processor uP0 of the heater alarm and control module is able to receive the alarm of the weak-power PWM1 sent by itself, it means that all the heaters along the pipeline have entered control range of temperature controller under normal working condition. Otherwise, it means that at least one heater is not within control range of temperature controller. At this moment, the heater alarm and control module will give alarm.

When the heater alarm and control module is merely used for an alarm, the terminal loop capacitor C1 can be replaced by a short-circuited circuit because both the capacitor and the ordinary cable are able to ensure openness of an AC loop. However, if a short-circuited circuit is adopted, the heater alarm and control module can't be used to switch working modes for heater temperature controller 102 and to modify the temperature set value of the heater temperature controller 102 (see details in the following description).

When the heater alarm and control module is about to carry out control operation for the heater temperature controller 102, a specific PWM1' signal different from the temperature alarm frequency shall be initially sent. When this signal reaches the input end of the first heater temperature controller 102, microprocessor uP1 in the first heater temperature controller 102 will detect the frequency of this signal through the optocoupler. If it is confirmed that the heater alarm and control module will send the controlled signal with a specific frequency, the uP1 processor in the heater temperature controller 102 will give the commands to compulsively close the optically coupled solid-state relay SSR, which will output the specific frequency PWM1' signal from the first output end of the first temperature controller 102 and transfer it to the input end of the second heater temperature controller 102. Likewise, the microprocessor in the latter heater temperature controller 102 will give the command to compulsively close the optically coupled solid-state relays SSR one by one, until the optically coupled solid-state relay SSR of n heater temperature controllers 102 are closed completely.

When the optically coupled solid-state relay SSR in all the heater temperature controllers 102 have compulsively closed, the heater alarm and control module will output a 5 VDC voltage to judge if the terminal loop is short-circuited. If the terminal loop is under state of DC short circuit, the analog input (AI) of the heater alarm and control module will detect this 5V voltage. At this moment, the control operation for the heater temperature controller 102 will be stopped. Under such condition, when triode Q1 is closed, the whole loop will be under state of short circuit. If the circuit is connected, the loop current will be excessive; it will affect reliability of control circuit.

If the terminal loop is proved to be under state of an open circuit, or with loop capacitance, the analog input (AI) of the heater alarm and control module will not detect this 5V voltage. At this moment, the heater alarm and control module will close triode Q1 and start to release 5 VDC or output the strong-power PWM2 signal after power promotion through the buffer operational amplifier, to control heater temperature controller 102. The microprocessor uP1 in all the temperature controllers along the pipeline will carry out the related operations according to the signal received.

FIG. 3 is an equivalent circuit of the normal alarm. Triode Q1 is under the state of an open circuit so it is ignored from the circuit diagram. The main processor uP0 of heater alarm and control module will send the weak-power PWM1 signal. If all the heaters have entered control range of temperature controller, the optically coupled solid-state relay of n heater temperature controllers 102 will be conducted. The optically coupled solid-state relay SSR in the temperature controller, the terminal capacitor C1 (0.1 uF), the AC dividing capacitor C2 (0.01 uF), and the capacitor C3 (0.1 uF) connected in series constitute a capacitive circuit The main processor uP0 of the heater alarm and control module can receive the PWM1 pulse representing normal operational condition of the heater to determine if all the heaters are under normal operation. If any of these relays are under the state of an open circuit, it means that at least one heater has not reached the set temperature for the heaters. Thus, the main processor uP0 of heater alarm and control module will give alarm.

If terminal capacitor C1 is not connected, the alarm function will fail. However, the function of modifying the temperature setting and the operational mode still works. If the terminal capacitor is short-circuited, the alarm function will still work but the function of modifying the temperature settings and the operational mode will not work (system self-protection).

Figure 4:
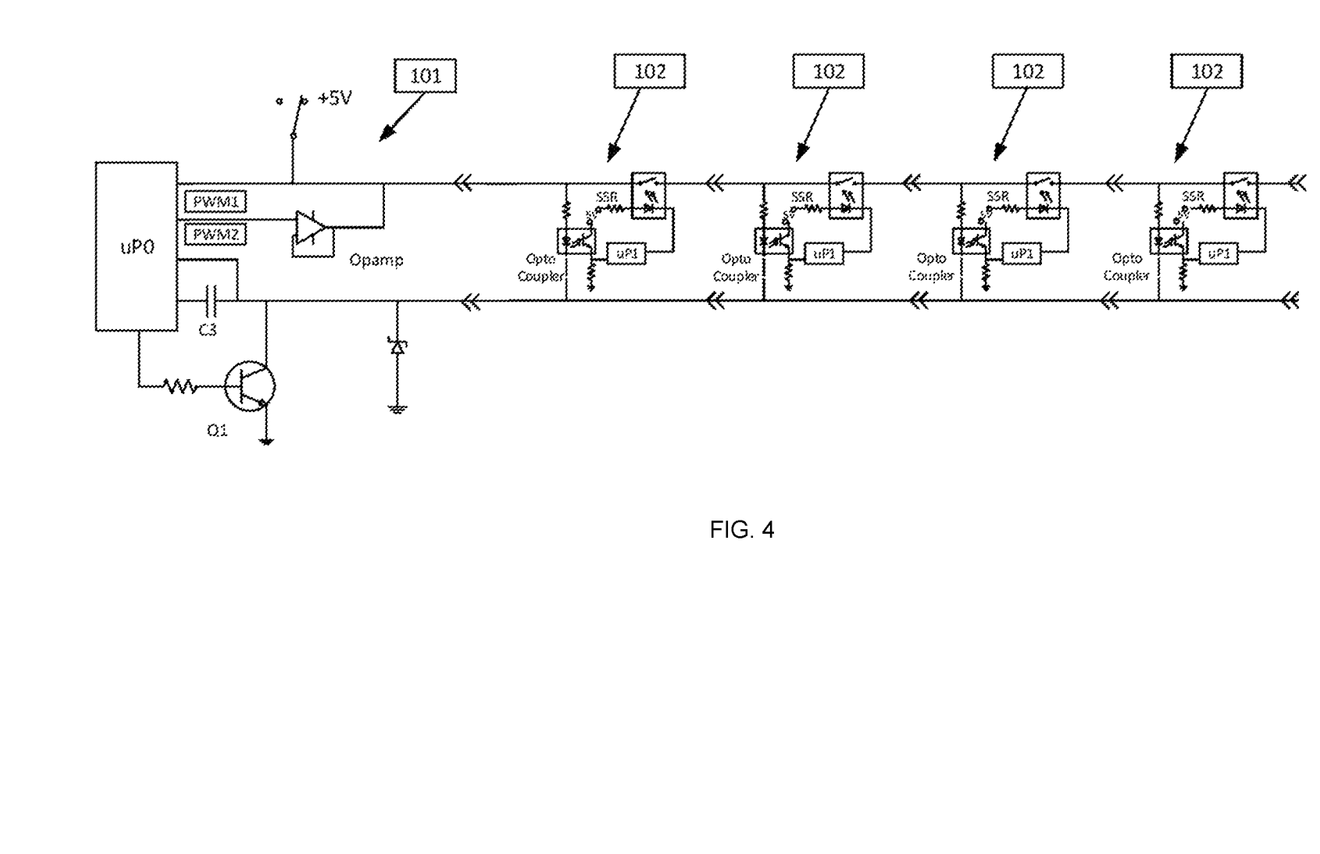
FIG. 4 is the equivalent circuit of the heater alarm and control module under the working condition of temperature setting.

The temperature setting of the heater temperature controller 102 is carried out according to the following steps:

1. Pre-Order for the Temperature Control is Sent to Compulsively Close the Solid-State Relay in the Heater Temperature Controller 102.

A specific frequency PWM1' signal is sent by the main processor uP0 of the heater alarm and control module to the heater temperature controller 102 through PWM1 signal line of heater alarm and control module. When the microprocessor uP1 of heater temperature controller 102 detects this signal, it will give commands immediately to compulsively close solid-state relays SSR in the heater temperature controller 102 one by one.

2. Detect if the Loop is DC Short-Circuited

5 VDC voltage is sent to the heater temperature controller 102 when the triode Q1 is under the state of an open circuit. If the main processor uP0 of the temperature controller detects 5V voltage, it means the loop is DC short-circuited and control command will not be sent. If the detected voltage is lower than 5V, Q1 will be closed and the operation of temperature control will be continued.

3. Temperature Setting

Temperature setting of the heater temperature controller 102 is realized by the high-power PWM2 signal sent by the main processor uP0 of the heater alarm and control module. Through the buffer operational amplifier, the power of PWM2 is promoted so PWM2 is able to drive all the optocouplers in heater temperature controller 102. Triode Q1 is conducted to ensure there is sufficient current to drive all the optocouplers (of which numbers can reach dozens).

When the microprocessor uP1 in the heater temperature controller 102 receives the pulse signal of PWM2, it will convert the detected PWM2 signal frequency to the temperature set value and save it in the chip.

4. Display of Temperature

Due to the simultaneous modification of the temperature setting of the multiple heater temperature controllers 102, the tri-color LED is adopted in this invention to display the set temperature of the heater temperature controllers 102. For example, one flash of red light means 100□; one flash of green light means 10° C.; one flash of blue light means 1° C.; quick flashing means 0. Such kind of design can realize design of simplified circuit and is very intuitive.

This temperature setting method can set the temperature set value of the multiple heater temperature controllers 102 at the same time without requiring setting of the address of the heater temperature controller 102 and installation of communication chips, which will greatly reduce cost and is convenient for users.

Figure 5:
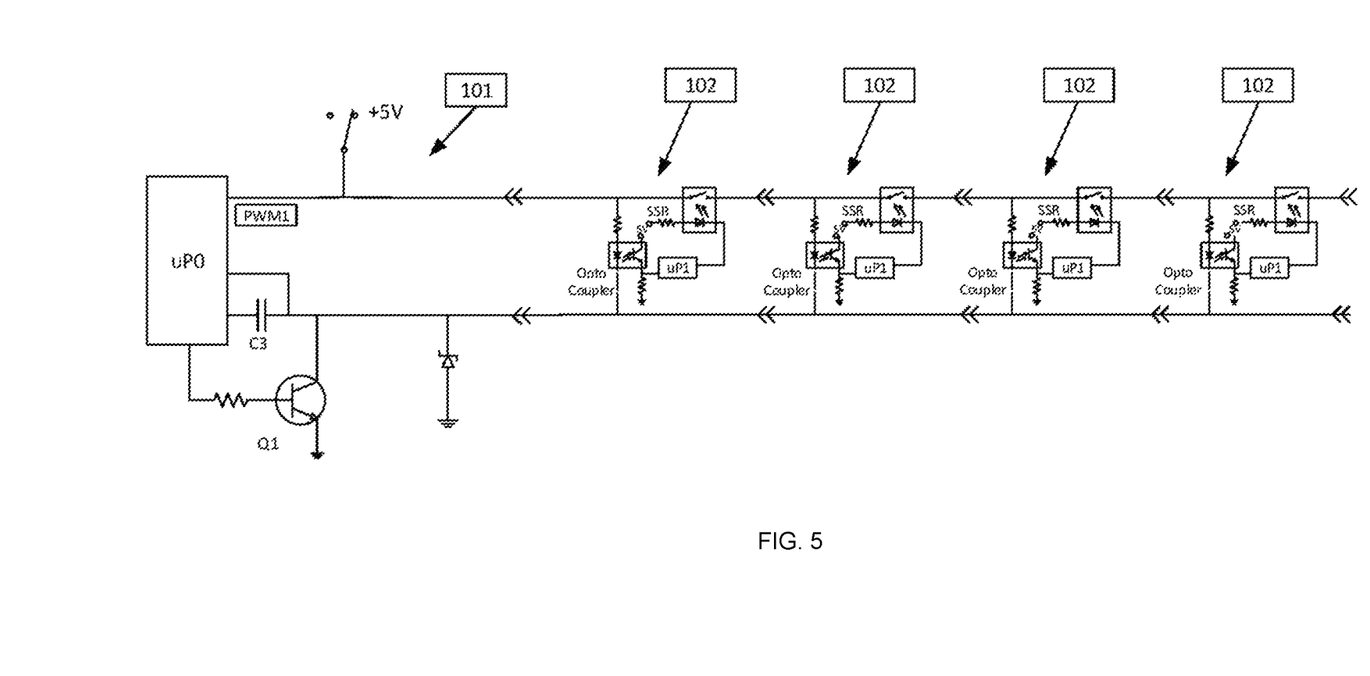
FIG. 5 is the equivalent circuit of the heater alarm and control module under working conditions of sleep control/activation of the second temperature control by the heater.

In addition, the heater alarm and control module can carry out sleep control/activation of the second temperature, which is completed by 5V DC voltage provided by heater alarm and control module. At this moment, the terminal capacitor is under the state of an open circuit (DC voltage shall not be conducted through capacitor); therefore, it is ignored in equivalent circuit diagram. However, triode Q1 is conducted; all the optocouplers for control are activated and all the optically coupled solid-state relays are compulsively closed. The following FIG. is the equivalent circuit of sleep control/activation of the second temperature control of heater temperature controller.

Under such working conditions, one specific frequency PWM1' signal will be sent by PWM1 in alarm and control module 101 before 5V DC voltage is opened up to direct the microprocessor uP1 in the heater temperature controller 102 to compulsively close the solid-state relay SSR in the heater temperature controller 102. Whether the loop is DC short-circuited is detected by 5 VDC voltage sent to the control circuit when triode Q1 is under the state of an open circuit. If the loop is DC short-circuited, alarm and control module 101 will detect 5V voltage. Under such conditions, the command of sleep control of the heater will not be implemented. If the loop is DC open-circuited, alarm and control module 101 will detect voltage lower than 5V. Under such conditions, the command of sleep control of heater will be sent. At this moment, the microprocessor in heater temperature controller 102 will detect a DC voltage which will trigger the second temperature control. If the second temperature set value is low enough, heater will enter a sleep state. The temperature value of the second temperature control is pre-saved in uP1. If 5V DC voltage is not detected, the normal temperature set value in the microprocessor of the temperature controller will be used; if 5V DC voltage is detected, the second temperature set value in the microprocessor of the temperature controller will be used for temperature control.

The foregoing illustration shows and describes the preferential example of this invention. It is understood that this invention is not only limited to the forms disclosed in this article and it shall not be regarded as the exclusion of other examples; instead, this invention can be used in other combinations, modification and environment; in addition, it can be modified through the foregoing instruction, or technology or knowledge of related fields within the scope of invention conception in this article. The modification and variation by the personnel in this field will not break away from the spirit and range of this invention and shall be within the protection scope of the attached claims of this invention.

What is claimed is:

1. A heater alarm and control module, comprising a main processor of the heater alarm and control module, a heater alarm and control circuit, and a heater temperature control module; the heater temperature control module comprises n heater temperature controllers; the main processor of the heater alarm and control module is connected with the heater temperature control module through the heater alarm and control circuit, wherein, each of the n heater temperature controllers comprises a microprocessor, an optically coupled solid-state relay and an optocoupler; the optically coupled solid-state relay comprises a light-emitting diode and a power switch; the optocoupler comprises a light-emitting diode and a phototriode; the microprocessor is connected with the optically coupled solid-state relay and the optocoupler, in which one end of the power switch of the optically coupled solid-state relay is connected with a positive electrode of the light-emitting diode of the optocoupler; the connected end constitutes an input end of the heater temperature controller; another end of the power switch of the optically coupled solid-state relay constitutes a first output end of the heater temperature controller; a negative electrode of the light-emitting diode of the optocoupler constitutes a second output end of the heater temperature controller; the positive electrode of the light-emitting diode of the optically coupled solid-state relay is connected to a direct-current power supply while the negative electrode is connected with one I/O interface of the microprocessor (uP1); a collector electrode of the phototriode of the optocoupler is connected to the direct-current power supply; an emitting electrode is grounded and connected to a CCP and an analog signal input end of the microprocessor simultaneously;

wherein, the main processor of the heater alarm and control module provides a control signal for the heater temperature control module and the control signal is input into an input end of an (n-1)th heater temperature controller; an input end of an nth heater temperature controller is connected with a first output end of the (n-1)th heater temperature controller; and each of second output ends of the n heater temperature controllers is linked and connected to the main processor of the heater alarm and control module through the heater alarm and control circuit.

2. The heater alarm and control module of claim 1, wherein the first output end of the nth heater temperature controller is connected with one end of a terminal loop capacitor while another end of the terminal loop capacitor is connected with the second output end of the nth heater temperature controller; the end of the terminal loop capacitor connected with the second output ends of the n heater temperature controllers is connected to the main processor of the heater alarm and control module through the heater alarm and control circuit.

3. The heater alarm and control module of claim 2, wherein a direct voltage is measured by connecting the second output ends of the n heater temperature controllers with the analog signal input end of the main processor of the heater alarm and control module; meanwhile, a frequency is measured by connecting a first capacitor with a CCP terminal of the main processor of the heater alarm and control module; the end of terminal loop capacitor connected with the second output ends of the n heater temperature controllers is grounded through an AC dividing capacitor, and meanwhile, is further connected with a collector electrode of a triode; a base electrode of the triode is connected with one I/O terminal of the main processor of the heater alarm and control module; an emitting electrode of the triode is grounded; during alarm, the triode is under a status of being cut-off; the triode is conductive during control over the heater temperature controllers.

4. The heater alarm and control module of claim 3, wherein when an input signal is a weak-power PWM signal, the signal is input to the heater temperature control module through the input end of the first heater temperature controller; the optocouplers in the n heater temperature controllers of the heater temperature control module are under the status of an open circuit; an optically coupled solid-state relays in the n heater temperature controllers form a series circuit;

when a temperature of the heater temperature controller is lower than a set value of the heater temperature controller, the microprocessor of the heater temperature controller is connected with the I/O interface of the negative electrode of the light-emitting diode of the optically coupled solid-state relay to output high potential to make the optically coupled solid-state relay under the status of the open circuit;

when a temperature of the heater temperature controller falls within a control scope of the heater temperature controller, the microprocessor of the heater temperature controller is connected with the I/O interface of the negative electrode of the light-emitting diode of the optically coupled solid-state relay to output low potential to make the optically coupled solid-state relay a closed circuit; the n optically coupled solid-state relays connected in series and the terminal loop capacitor constitute the loop of the heater alarm and control circuit.

5. The heater alarm and control module of claim 3, wherein when the heater alarm and control module is about to make a control operation towards the heater temperature controller, the heater alarm and control module has to send a PWM signal of a specific frequency initially to input the PWM signal into the input end of the first heater temperature controller;

the microprocessor in the first heater temperature controller detects a frequency of the signal through the optocoupler; if it is confirmed that the heater alarm and control module has sent the specific frequency signal of the control signal, the microprocessor in the heater temperature controller gives a command to compulsively close the optically coupled solid-state relay, and let the PWM signal of the specific frequency be output from the first output end of the first temperature controller and be transmitted to the input end of the second heater temperature controller; similarly, the microprocessor in the latter heater temperature controller gives the command to compulsively close an optically coupled solid-state relays one by one, until all the optically coupled solid-state relays of n heater temperature controllers are closed;

the heater alarm and control module closes the triode and starts to send a DC voltage signal or output a high-power PWM signal after power promotion through a buffer operational amplifier to control each heater temperature controller.

6. The heater alarm and control module of claim 5, wherein temperature settings of the heater temperature controller are realized through the high-power PWM signal sent by the main processor of the heater alarm and control module; the high-power PWM signal is able to drive all the optocouplers in the heater temperature controller after power promotion through the buffer operational amplifier, the triode is conductive;

when the microprocessor in the heater temperature controller receives a pulse signal of the high-power PWM signal, the microprocessor in the heater temperature controller detects the high-power PWM signal frequency and converts it into a temperature set value.

7. The heater alarm and control module of claim 5, wherein a sleep control/activation of a second temperature controlled by the heater temperature controller can be realized through the DC voltage signal provided by the heater alarm and control module;

a second temperature set value is saved in the microprocessor in each heater temperature controller; when the heater alarm and control module closes the triode to control each heater temperature controller, the DC voltage signal is sent and detected by the microprocessor of each heater temperature controller;

if the DC voltage signal is not detected, the temperature controller uses a normal temperature set value in the microprocessor; if the DC voltage signal is detected, the temperature controller uses the second temperature set value in the microprocessor for temperature control.

8. The heater alarm and control module of claim 5, wherein when the optically coupled solid-state relays in all the heater temperature controllers are compulsively closed, the heater alarm and control module outputs one DC voltage signal to judge if the terminal loop is short-circuited;

if the terminal loop is under the state of a DC short circuit, an analog input end of the main processor of heater alarm and control module detects the DC voltage signal and stops the control operation for the heater temperature controller;

if the terminal loop is under the open circuit condition, or with loop capacitance, the analog input end of the main processor of the heater alarm and control module does not detect this 5V voltage and continues the control operation for the heater temperature controller.

9. The heater alarm and control module of claim 8, wherein temperature settings of the heater temperature controller are realized through the high-power PWM signal sent by the main processor of the heater alarm and control module; the high-power PWM signal is able to drive all the optocouplers in the heater temperature controller after power promotion through the buffer operational amplifier, the triode is conductive;

when the microprocessor in the heater temperature controller receives a pulse signal of the high-power PWM signal, the microprocessor in the heater temperature controller detects the high-power PWM signal frequency and converts it into a temperature set value.

10. The heater alarm and control module of claim 8, wherein a sleep control/activation of a second temperature controlled by the heater temperature controller can be realized through the DC voltage signal provided by the heater alarm and control module;
- a second temperature set value is saved in the microprocessor in each heater temperature controller; when the heater alarm and control module closes the triode to control each heater temperature controller, the DC voltage signal is sent and detected by the microprocessor of each heater temperature controller;
- if the DC voltage signal is not detected, the temperature controller uses a normal temperature set value in the microprocessor; if the DC voltage signal is detected, the temperature controller uses the second temperature set value in the microprocessor for temperature control.

11. The heater alarm and control module of claim 2, wherein the main processor of the heater alarm and control module provides three kinds of control signals for the heater temperature control module comprising a direct-current power supply, a weak-power PWM signal and a high-power PWM signal, which are used to realize three kinds of working modes comprising a control mode, an alarm mode, or a temperature setting mode respectively.

12. The heater alarm and control module of claim 1, wherein a high-power PWM signal is output to the input end of the first heater temperature controller after power improvement through a buffer operational amplifier.

13. The heater alarm and control module of claim 11, wherein a direct voltage is measured by connecting the second output ends of the n heater temperature controllers with the analog signal input end of the main processor of the heater alarm and control module; meanwhile, a frequency is measured by connecting a first capacitor with a CCP terminal of the main processor of the heater alarm and control module; the end of terminal loop capacitor connected with the second output ends of the n heater temperature controllers is grounded through an AC dividing capacitor, and meanwhile, is further connected with a collector electrode of a triode; a base electrode of the triode is connected with one I/O terminal of the main processor of the heater alarm and control module; an emitting electrode of the triode is grounded; during alarm, the triode is under a status of being cut-off; the triode is conductive during control over the temperature controller.

14. The heater alarm and control module of claim 13, wherein when an input signal is a weak-power PWM signal, the signal is input to the heater temperature control module through the input end of the first heater temperature controller; the optocouplers in the n temperature controllers of the heater temperature control module are under the status of an open circuit; an optically coupled solid-state relays in the n temperature controllers form a series circuit;
- when a temperature of the heater temperature controller is lower than a set value of the temperature controller, the microprocessor of the heater temperature controller is connected with the I/O interface of the negative electrode of the light-emitting diode of the optically coupled solid-state relay to output high potential to make the optically coupled solid-state relay under the status of the open circuit;
- when a temperature of the heater temperature controller falls within a control scope of the temperature controller, the microprocessor of the heater temperature controller is connected with the I/O interface of the negative electrode of the light-emitting diode of the optically coupled solid-state relay to output low potential to make the optically coupled solid-state relay a closed circuit; the n optically coupled solid-state relays connected in series and the terminal loop capacitor constitute the loop of the heater alarm and control circuit.

15. The heater alarm and control module of claim 13, wherein when the heater alarm and control module is about to make a control operation towards the heater temperature controller, the heater alarm and control module has to send a PWM signal of a specific frequency initially to input the PWM signal into the input end of the first heater temperature controller;
- the microprocessor in the first heater temperature controller detects a frequency of the signal through the optocoupler; if it is confirmed that the heater alarm and control module has sent the specific frequency signal of the control signal, the microprocessor in the heater temperature controller gives a command to compulsively close the optically coupled solid-state relay, and let the PWM signal of the specific frequency be output from the first output end of the first temperature controller and be transmitted to the input end of the second heater temperature controller; similarly, the microprocessor in the latter heater temperature controller gives the command to compulsively close an optically coupled solid-state relays one by one, until all the optically coupled solid-state relays of n heater temperature controllers are closed;
- the heater alarm and control module closes the triode and starts to send a DC voltage signal or output the high-power PWM signal after power promotion through a buffer operational amplifier to control each heater temperature controller.

16. The heater alarm and control module of claim 15, wherein temperature settings of the heater temperature controller are realized through the high-power PWM signal sent by the main processor of the heater alarm and control module; the high-power PWM signal is able to drive all the optocouplers in the heater temperature controller after power promotion through the buffer operational amplifier, the triode is conductive;
- when the microprocessor in the heater temperature controller receives a pulse signal of the high-power PWM signal, the microprocessor in the heater temperature controller detects the high-power PWM signal frequency and converts it into a temperature set value.

17. The heater alarm and control module of claim 15, wherein a sleep control/activation of a second temperature controlled by the heater temperature controller can be realized through the DC voltage signal provided by the heater alarm and control module;
- a second temperature set value is saved in the microprocessor in each heater temperature controller; when the heater alarm and control module closes the triode to control each heater temperature controller, the DC voltage signal is sent and detected by the microprocessor of each heater temperature controller;
- if the DC voltage signal is not detected, the temperature controller uses a normal temperature set value in the microprocessor; if the DC voltage signal is detected, the temperature controller uses the second temperature set value in the microprocessor for temperature control.

18. The heater alarm and control module of claim 15, wherein when the optically coupled solid-state relays in all the heater temperature controllers are compulsively closed, the heater alarm and control module outputs one DC voltage signal to judge if the terminal loop is short-circuited;

if the terminal loop is under the state of a DC short circuit, an analog input end of the main processor of heater alarm and control module detects the DC voltage signal and stops the control operation for the heater temperature controller;

if the terminal loop is under the open circuit condition, or with loop capacitance, the analog input end of the main processor of the heater alarm and control module does not detect this 5V voltage and continues the control operation for the heater temperature controller.

19. The heater alarm and control module of claim 18, wherein temperature settings of the heater temperature controller are realized through the high-power PWM signal sent by the main processor of the heater alarm and control module; the high-power PWM signal is able to drive all the optocouplers in the heater temperature controller after power promotion through the buffer operational amplifier, the triode is conductive;

when the microprocessor in the heater temperature controller receives a pulse signal of the high-power PWM signal, the microprocessor in the heater temperature controller detects the high-power PWM signal frequency and converts it into a temperature set value.

20. The heater alarm and control module of claim 18, wherein a sleep control/activation of the second temperature control by the heater temperature controller can be realized through the DC voltage signal provided by the heater alarm and control module;

a second temperature set value is saved in the microprocessor in each heater temperature controller; when the heater alarm and control module closes the triode to control each heater temperature controller, the DC voltage signal is sent and detected by the microprocessor of each heater temperature controller;

if the DC voltage signal is not detected, the temperature controller uses a normal temperature set value in the microprocessor; if the DC voltage signal is detected, the temperature controller uses the second temperature set value in the microprocessor for temperature control.

* * * * *